United States Patent
Singh et al.

(10) Patent No.: US 7,499,708 B2
(45) Date of Patent: Mar. 3, 2009

(54) MILLIMETER MICROWAVE POINT-TO-MULTIPOINT BROADCASTING SYSTEMS, COMPONENTS AND METHODS THAT MONITOR AND REBROADCAST DATA PACKETS

(75) Inventors: Rajendra Singh, Alexandria, VA (US); George Ronald Olexa, Gainesville, GA (US)

(73) Assignee: Telcom Ventures, L.L.C., McLean, VA (US)

( * ) Notice: Subject to any disclaimer, the term of this patent is extended or adjusted under 35 U.S.C. 154(b) by 837 days.

(21) Appl. No.: 10/937,714

(22) Filed: Sep. 9, 2004

(65) Prior Publication Data

US 2006/0052067 A1    Mar. 9, 2006

(51) Int. Cl.
  *H04Q 7/20*    (2006.01)
  *H04B 7/14*    (2006.01)
  *H04B 7/00*    (2006.01)

(52) U.S. Cl. ................ 455/454; 455/7; 455/39; 455/500

(58) Field of Classification Search ........ 455/454, 455/450, 39, 500, 503, 510, 427, 430, 67.15, 455/7; 370/278, 279, 293, 310, 315, 328
See application file for complete search history.

(56) References Cited

U.S. PATENT DOCUMENTS

| | | | | |
|---|---|---|---|---|
| 5,027,356 A * | 6/1991 | Nakamura et al. | .......... | 714/748 |
| 5,901,226 A * | 5/1999 | Brenner et al. | .............. | 455/437 |
| 5,920,813 A | 7/1999 | Evans et al. | | |
| 6,016,313 A | 1/2000 | Foster, Jr. et al. | | |
| 6,285,868 B1 * | 9/2001 | LaDue | ........................ | 455/410 |
| 6,466,552 B1 | 10/2002 | Haumont | | |
| 6,522,877 B1 | 2/2003 | Lietsalmi et al. | | |
| 6,594,246 B1 * | 7/2003 | Jorgensen | .................... | 370/338 |
| 6,735,452 B1 | 5/2004 | Foster, Jr. et al. | | |
| 6,873,644 B1 * | 3/2005 | Barrett | ........................ | 375/138 |
| 7,373,105 B2 * | 5/2008 | Dybdal et al. | .............. | 455/13.4 |
| 2002/0080774 A1 * | 6/2002 | Griffith et al. | ................ | 370/352 |

FOREIGN PATENT DOCUMENTS

| | | |
|---|---|---|
| EP | 0 782 356 A2 | 7/1997 |
| EP | 0 782 356 A3 | 7/1997 |
| EP | 1 519 598 A1 | 3/2005 |
| WO | WO 2005/079021 A1 | 8/2005 |

OTHER PUBLICATIONS

Notification of Transmittal of the International Search Report and the Written Opinion of the International Searching Authority, or the Declaration, International Search Report and Written Opinion of the International Search Authority, PCT/US2005/031851, Mar. 10, 2006.

* cited by examiner

*Primary Examiner*—Sonny Trinh
(74) *Attorney, Agent, or Firm*—Myers Bigel Sibley & Sajovec, P.A.

(57) ABSTRACT

Selected data packets that were broadcast over millimeter microwave frequencies to millimeter microwave receiving stations in a millimeter microwave broadcasting system footprint are rebroadcast. Rebroadcasting is selected based upon an indication that is received from a subset of the millimeter microwave receiving stations, that the one or more data packets were not received successfully by the subset of the millimeter microwave receiving stations. Selective rebroadcasting may be performed based upon statistical analysis of indications that are received from the subset of the millimeter microwave receiving stations.

64 Claims, 4 Drawing Sheets

MILLIMETER MICROWAVE POINT-TO-MULTIPOINT BROADCASTING SYSTEMS, COMPONENTS AND METHODS THAT MONITOR AND REBROADCAST DATA PACKETS

FIELD OF THE INVENTION

This invention relates to communication systems, components and methods, and more particularly to millimeter microwave point-to-multipoint broadcasting systems, components and methods.

BACKGROUND OF THE INVENTION

Millimeter microwave point-to-multipoint broadcasting systems, components and methods are widely used to broadcast content, including audio, video, multimedia and/or data, from a millimeter microwave transmitting station to a large number of millimeter microwave receiving stations. As used herein, the term "millimeter microwave" refers to microwave frequencies above approximately 10 GHz, and may include, for example, publicly available frequency spectra at 10, 18, 23, 24, 31, 38, 60, 70, 80 and/or 90 GHz. The publicly available frequency spectra at 23, 31 and 38 GHz may be particularly amenable to support the functionality of point-to-multipoint broadcasting.

One potential problem of millimeter microwave point-to-multipoint broadcasting systems, components and methods is commonly referred to as "rain fade", which denotes the reduced coverage area that may be available from a transmitting station when raining. In particular, raindrops may provide significant attenuation of millimeter microwave frequencies. Thus, for example, absent rain fade, a millimeter microwave point-to-multipoint broadcasting system may have a coverage area of about 10 miles, whereas during rain fade, this coverage area may be reduced to about 1.5 miles.

U.S. Pat. No. 6,735,452 to Foster, Jr. et al., entitled System and Method for Broadband Millimeter Wave Data Communication, notes at Column 18, lines 28-42, that periodic adjustment of communication parameters may be necessary, even where an initialization algorithm has been utilized to properly initialize such communication parameters, because of the occurrence of anomalies effecting communication. For example, although an initial QAM rate and/or transmission power level may be selected upon initialization of communication, various atmospheric conditions, such as rain, may cause significant signal attenuation. Therefore, it is advantageous to monitor communication parameters to provide adjustment compensating for the occurrence of such anomalies. It shall be appreciated that the monitoring of communication parameters and communication of control functions may be from a node to a hub where such node has detected unacceptable communication attributes. Also see U.S. Pat. No. 6,016,313 to Foster Jr. et al., also entitled System and Method for Broadband Millimeter Wave Data Communication.

Moreover, U.S. Pat. No. 5,920,813 to Evans et al., entitled Microwave Video Distribution System and Adaptable Microwave Transmitting Station, describes, in the Abstract thereof, that in a cell of a microwave cellular video distribution system, e.g., a multichannel video distribution system operating at frequencies of around 29 GHz or 40 GHz, the transmitting antenna is composed of individual antenna sectors for transmitting the microwave signal towards different sectors of the cell. A respective monitor is present in each of the different sectors of each/the cell to monitor the microwave signal transmitted in that sector. The antenna sectors are individually fed through controllable feed means which permit individual control of the power level of the microwave signals transmitted by the individual antenna sectors, including the switching off of that sector. A feedback coupling is present between each monitor and the controllable feed means of the respective antenna sector to control individually the power levels transmitted towards the different sectors of each cell. In this manner the transmission pattern in each cell can be controlled and adapted to improve the quality of signal reception as requested by subscribers to increase the operational life of the transmitting station(s) by minimizing transmitting station power, and to enhance responsiveness to other desirable and/or acceptable demands placed on the signal transmission.

SUMMARY OF THE INVENTION

Millimeter microwave point-to-multipoint broadcasting systems, according to some embodiments of the present invention, include a millimeter microwave transmitter that is operable to broadcast the series of data packets over millimeter microwave frequencies, to a plurality of millimeter microwave receiving stations in a millimeter microwave broadcasting system footprint. A monitoring station also is located in the millimeter microwave broadcasting system footprint, and is operable to identify data packets in the series of data packets that are not received successfully by the monitoring station. A millimeter microwave transmitter controller is responsive to the monitoring station, and is operable to control the millimeter microwave transmitter to rebroadcast to the plurality of millimeter microwave receiving stations in the millimeter microwave broadcasting system footprint, at least one of the data packets that was identified as not received successfully by the monitoring station.

In other embodiments, the monitoring station is a first monitoring station, and the system further includes a second monitoring station that is located in the millimeter microwave broadcasting footprint and that is operable to identify data packets in the series of data packets that are not received successfully by the second monitoring station. In these embodiments, the millimeter microwave transmitter controller is responsive to the first and second monitoring stations, and is operable to control the millimeter microwave transmitter to rebroadcast to the plurality of millimeter microwave receiving stations in the millimeter microwave broadcasting system footprint, at least one of the data packets that was identified as not received successfully by the first and/or second monitoring stations.

In some embodiments, the at least one of the data packets that was identified as not received by the first and/or second monitoring stations is analyzed statistically to obtain an indication as to the likelihood that a significant number of receiving stations did not successfully receive the identified data packets. A determination is then made as to whether to rebroadcast one or more of the data packets based on the statistical determination.

In some embodiments, a respective data packet includes a respective packet identification and the monitoring station is operable to identify data packets in the series of data packets that were not received successfully by the monitoring station by indicating packet identifications that identify data packets that were or were not received successfully by the monitoring station. Thus, an identification of a last successfully received packet may be provided in some embodiments.

In other embodiments, the monitoring station is operable to identify data packets that are not received successfully by the monitoring station based on a quality metric of the data packets that are received by the monitoring station and/or to identify data packets that are not received at all by the monitoring station. In some embodiments, the quality metric comprises a received signal strength indication, a bit error rate, a frame error rate and/or any other conventional quality metric.

In other embodiments of the present invention, the millimeter microwave transmitter controller is also operable to control the millimeter microwave transmitter to vary a link margin of the transmitter in response to the monitoring station. Thus, in addition to the use of selective rebroadcasting, the link margin of the transmitter may also be varied in response to information provided by the monitoring station(s). In some embodiments, the link margin may be varied by varying the power and/or a modulation parameter of the millimeter microwave transmitting station.

In some embodiments of the present invention, rebroadcasting takes place by the millimeter microwave transmitter alternatingly broadcasting data packets and rebroadcast data packets over millimeter microwave frequencies to the plurality of millimeter microwave receiving stations in the millimeter microwave broadcasting system footprint. In other embodiments, the broadcast data packets and rebroadcast data packets are simultaneously broadcast over millimeter microwave frequencies to the plurality of millimeter microwave receiving stations in the millimeter microwave broadcasting system footprint. In some embodiments, variable relative bandwidths may be used for simultaneously broadcasting the data packets and the rebroadcast data packets, depending on the number of packets to be rebroadcast.

Millimeter microwave receiving stations according to some embodiments of the present invention are responsive to the broadcast data packets and the rebroadcast data packets. The millimeter microwave receiving stations are operable to substitute a rebroadcast data packet for a broadcast data packet that was not received successfully at the respective millimeter microwave receiving station. In some embodiments, the millimeter microwave receiving station is also operable to discard a rebroadcast data packet when a corresponding broadcast data packet was received successfully at the millimeter microwave receiving station.

In some embodiments, the monitoring station(s) are independent of and separate from the millimeter microwave receiving stations. In other embodiments, the monitoring station(s) are at least partially integrated with millimeter microwave receiving station(s).

It will be understood that embodiments of the invention have been described above primarily with respect to millimeter microwave point-to-multipoint broadcasting systems. However, other embodiments of the present invention provide components of these systems, such as a transmitting station, a monitoring station and/or a receiving station of a millimeter microwave point-to-multipoint broadcasting system. Moreover, analogous method embodiments also may be provided.

Millimeter microwave point-to-multipoint broadcasting methods according to other embodiments of the invention selectively rebroadcast at least one of the series of data packets that was broadcast over millimeter microwave frequencies to a plurality of millimeter microwave receiving stations in a millimeter microwave broadcasting system footprint, based upon an indication that is received from a subset of the plurality of millimeter microwave receiving stations, that the at least one of a series of data packets that was broadcast was not received successfully by the subset of the plurality of millimeter microwave receiving stations. In some embodiments, the subset of the plurality of millimeter microwave receiving stations consists of a single millimeter microwave receiving station, whereas in other embodiments, two or more, but less that all of, the plurality of millimeter microwave receiving stations are used. As was described above, selective rebroadcasting may be performed based upon statistical analysis of indications that are received from a subset of the plurality of millimeter microwave receiving stations. Moreover, in some embodiments, selective rebroadcasting may be performed in an alternating manner with broadcasting of data packets, whereas in other embodiments, selective rebroadcasting and broadcasting are performed simultaneously. Analogous system embodiments also may be provided. Analogous monitoring methods also may be performed by a subset of the plurality of millimeter microwave receiving stations.

In still other embodiments of the present invention, a series of data packets are broadcast over millimeter microwave frequencies to a plurality of millimeter microwave receiving stations in a millimeter microwave broadcasting system footprint, absent rain fade. Moreover, a series of data packets is broadcast and at least one of a series of broadcast data packets is selectively rebroadcast over millimeter microwave frequencies to the plurality of millimeter microwave receiving stations in the millimeter microwave broadcasting system footprint, during and/or after a rain fade. Analogous system embodiments also may be provided.

According to still other embodiments of the present invention, a series of broadcast data packets are received over millimeter microwave frequencies at a millimeter microwave receiving station in a millimeter microwave broadcasting system footprint, absent rain fade. Moreover, a series of broadcast data packets and at least one selectively rebroadcast data packet, are received over the millimeter microwave frequencies at the millimeter microwave receiving station at the millimeter microwave broadcasting system footprint, during and/or after a rain fade.

A millimeter microwave point-to-multipoint broadcasting system may be operated, according to some embodiments of the present invention, by placing a plurality of millimeter microwave receiving stations in a millimeter microwave broadcasting system footprint that extends away from a millimeter microwave transmitting station to a distance that allows a series of data packets that are broadcast by the millimeter microwave transmitting station to be received successfully by the plurality of millimeter microwave receiving stations, absent rain fade. Moreover, a series of data packets is broadcast and at least one of the series data packets is selectively rebroadcast from the millimeter microwave transmitting station to the plurality of millimeter microwave receiving stations in the millimeter microwave broadcasting system footprint, during and/or after a rain fade. Accordingly, a system may be designed with a relatively large footprint based on absence of rain fade, and rebroadcasting may be used for effective packet broadcasting over the relatively large footprint during and/or after a rain fade.

Other embodiments of the present invention can selectively rebroadcast data packets based on a data packet not being received successfully at a millimeter microwave transmitting station from another millimeter microwave transmitting station. Thus, in these embodiments, a millimeter microwave transmitting station itself can listen to broadcasts from one or more neighboring millimeter microwave transmitting stations, and can detect failures to receive a data packet. These embodiments may be used independently or in combination with any of the above-described embodiments.

DETAILED DESCRIPTION

Figure 1:
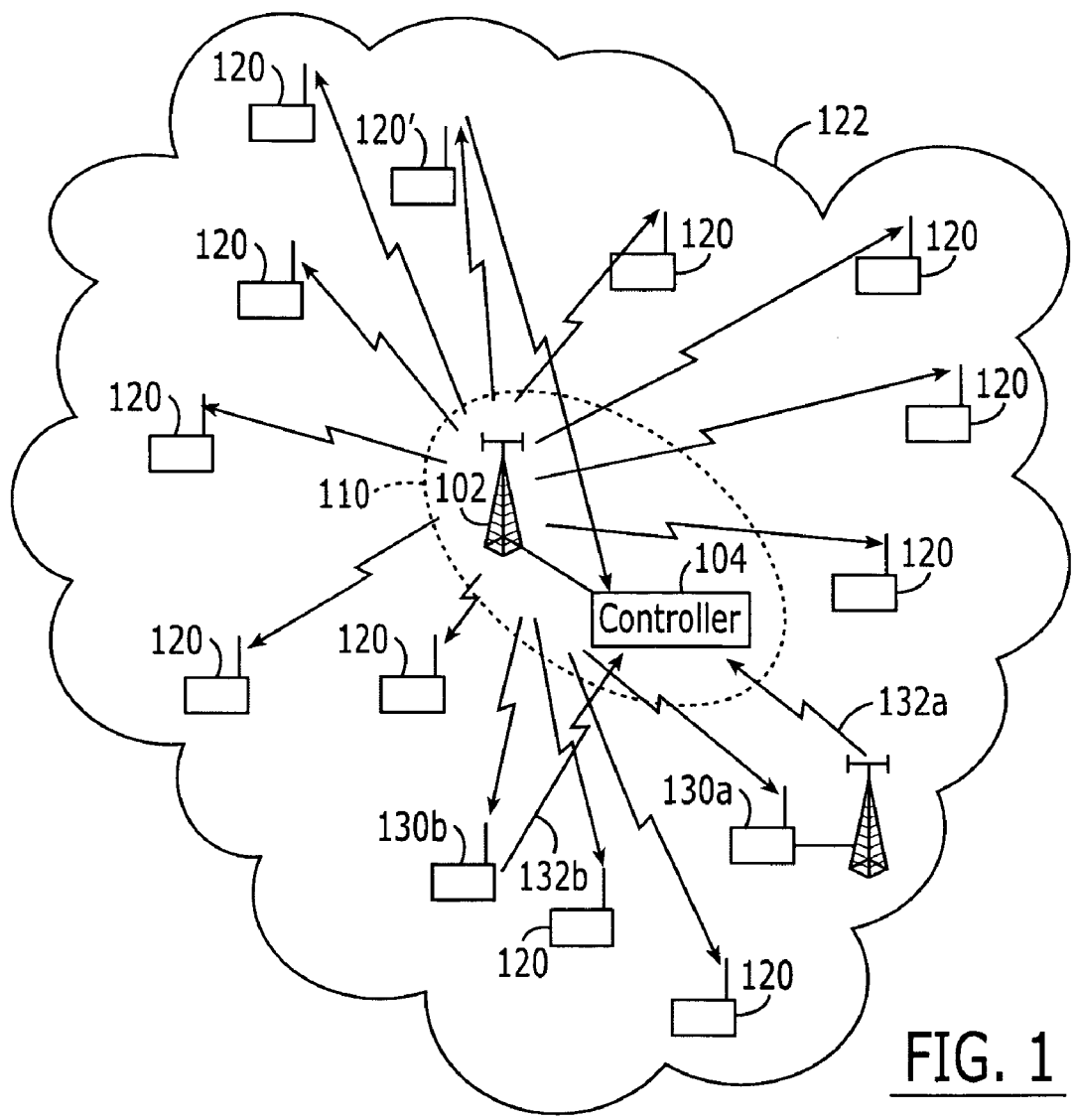
FIG. 1 is a block diagram of millimeter microwave point-to-multipoint broadcasting systems, methods and components according to various embodiments of the present invention.

Embodiments of the present invention now will be described more fully hereinafter with reference to the accompanying drawings, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In contrast, the term "consisting of" when used in this specification, specifies the stated number of millimeter microwave receiving stations and precludes additional millimeter microwave receiving stations. As used herein the term "and/or" includes any and all combinations of one or more of the associated listed items.

The present invention is described below with reference to block diagrams and/or flowchart illustrations of methods, apparatus (systems) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks. Accordingly, the present invention may be embodied in hardware and/or in software (including firmware, resident software, micro-code, etc.).

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Finally, it will be understood that, although the terms first, second, etc. may be used herein to describe various elements, these elements should not be limited by these terms. These terms are only used to distinguish one element from another. For example, a first monitoring station could be termed a second monitoring station, and, similarly, a second monitoring station could be termed a first monitoring station without departing from the teachings of the disclosure.

FIG. 1 is a block diagram of millimeter microwave point-to-multipoint broadcasting systems, methods and components according to various embodiments of the present invention. As shown in FIG. 1, a millimeter microwave transmitting station 110 includes a millimeter microwave transmitter and a millimeter microwave transmitter controller 104. The millimeter microwave transmitter 102 is operable to broadcast a series of data packets over millimeter microwave frequencies to a plurality of millimeter microwave receiving stations 120 in a millimeter microwave broadcasting system footprint 122. Although a single millimeter microwave transmitting station 110 is shown in FIG. 1, more than one transmitting station 110 may be used to enlarge the footprint 122. Moreover, although a relatively small number of millimeter microwave receiving stations 120 are shown in FIG. 1, conventionally, hundreds, thousands or more of millimeter microwave receiving stations 120 may be provided. As was described below, in some embodiments, a single transmitting station 110 may provide a broadcast footprint 122 having a radius of about 10 miles in clear (non-rainy) weather.

Still referring to FIG. 1, at least one monitoring station also is provided within the millimeter microwave broadcasting system footprint 122. In FIG. 1, two separate monitoring stations 130a and 130b are shown. As will be described in detail below, a monitoring station 130a and/or 130b is operable to identify data packets in the series of data packets that are not received successfully by the monitoring station 130a/130b.

Still referring to FIG. 1, the millimeter microwave transmitter controller 104 is responsive to the monitoring stations 130a and/or 130b, and is operable to control the millimeter microwave transmitter 102, to rebroadcast to the plurality of millimeter microwave receivers 120 in the millimeter microwave broadcasting footprint 122, at least one of the data packets that was identified as not received successfully by the monitoring station(s) 130a and/or 130b. As shown in FIG. 1, a monitoring station 130a may communicate with the controller 104 using a wireless link 132a using, for example, conventional cellular and/or satellite frequencies. A hardwired link 132b also may be used. Moreover, in FIG. 1, the monitoring stations 130a and 130b are separate from the receiving stations 120. However, as also shown in FIG. 1, a subset of the receiving stations 120, such as the receiving station 120', may include a monitoring station at least partially integrated therein, and may communicate with the controller 104 using, for example, millimeter microwave frequencies and/or other conventional wired and/or wireless links.

Accordingly, as shown in FIG. 1, unidirectional broadcasting (or datacasting) systems and/or methods are provided wherein data packets are unidirectionally broadcast from the millimeter microwave transmitter 102 to the plurality of millimeter microwave receiving stations 120. Monitoring station(s) 130a, 130b and/or 120' are selectively placed within the millimeter microwave broadcasting system footprint 122, to identify data packets in the series of data packets that are not received successfully by the monitoring station(s). The millimeter microwave transmitter controller 104 is then operable to control the millimeter microwave transmitter 102 to rebroadcast at least one of the data packets that was identified as not received successfully by one and/or more of the monitoring stations. Bidirectional communications capabilities therefore need not be provided in all of the millimeter microwave receiving stations 120 in order to obtain an assessment of the efficacy of the transmission. Statistical analysis may be performed by the millimeter microwave transmitter controller 104, in order to determine the extent to which a data packet was not received, and to assess whether to rebroadcast the data packet.

As shown in FIG. 1, embodiments of the present invention need not obtain complete knowledge about the error conditions at every receiving station, but, instead, may utilize a statistical analysis of the report(s) sent by the monitoring station(s) and/or a subset of the receiving station(s), to make determinations as to what actions may be desirable to improve the receive error rate experienced by the monitoring stations, and, thus, increase the link margin or error-free information delivery at a statistically significant number of the receiving stations 120 that are being served by the transmitter 102.

Viewed from another perspective, FIG. 1 illustrates systems, methods and components according to some embodiments of the present invention, wherein at least one of a series of data packets that was broadcast over millimeter microwave frequencies to a plurality of millimeter microwave receiving stations 120, 120', 130a and/or 130b in a millimeter microwave broadcasting system footprint 122, is selectively rebroadcast. Selective rebroadcasting is performed based upon an indication that is received from a subset 130a, 130b and/or 120' of the plurality of millimeter microwave receiving stations, that the at least one of a series of data packets that was broadcast was not received successfully by the subset 120', 130a and/or 130b of the plurality of millimeter microwave receiving stations. In some embodiments, the subset of the plurality of millimeter microwave receiving stations consists of a single millimeter microwave receiving station 120', 130a or 130b. In other embodiments, the subset of the plurality of millimeter microwave receiving stations consists of two or more of the receiving stations (i.e., at least two of receiving stations 130a, 130b and 120'), but less than all of the plurality of millimeter microwave receiving stations 120. Similarly, FIG. 1 may be regarded as illustrating monitoring stations and methods that are performed by a subset of the plurality of millimeter microwave receiving stations.

Viewed from yet another perspective, FIG. 1 illustrates systems, methods and components according to other embodiments of the present invention, wherein a series of data packets is broadcast over millimeter microwave frequencies to a plurality of millimeter microwave receiving stations 120, 120', 130a and/or 130b in a millimeter microwave broadcasting system footprint 122, absent rain fade. Moreover, a series of data packets is broadcast, and at least one of the series of data packets that was previously broadcast is selectively rebroadcast, over the millimeter microwave frequencies to the plurality of millimeter microwave receiving stations 120, 120', 130a and/or 130b in the millimeter microwave broadcasting system footprint 122, during and/or after a rain fade.

Finally, when viewed from still other perspectives, FIG. 1 illustrates systems, methods and components of operating a millimeter microwave point-to-multipoint broadcasting system to provide an extended footprint 122. A plurality of millimeter microwave receiving stations 120, 120', 130a and/or 130b are placed in a millimeter microwave broadcasting system footprint 122 that extends away from a millimeter microwave transmitting station 110, up to a distance that allows a series of data packets that are broadcast by the millimeter microwave transmitting station 110, to be received successfully by the plurality of millimeter microwave receiving stations 120, 120', 130a and/or 130b, absent rain fade. A series of data packets is broadcast and at least one of the series of data packets that was previously broadcast is selectively rebroadcast, from the millimeter microwave transmitting station 110 to the plurality of millimeter microwave receiving stations 120, 120', 130a and/or 130b in the millimeter microwave broadcasting system footprint 122, during and/or after a rain fade. Thus, the millimeter microwave point-to-multipoint broadcasting system footprint 122 may be sized for non-rain fade conditions with a radius of, for example, about 10 miles, and selective rebroadcasting may be used to provide adequate reception of data packets during and/or after rain fade over the extended footprint 122.

Figure 2:
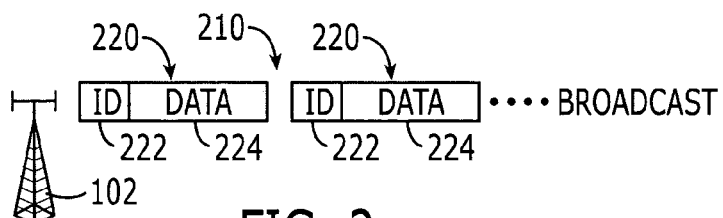
FIGS. 2-4 are block diagrams that illustrate broadcasting a series of data packets and rebroadcasting selected data packets according to various embodiments of the present invention.

FIG. 2 is a block diagram that illustrates broadcasting a series of data packets over millimeter microwave frequencies by a millimeter microwave transmitter, such as the millimeter microwave transmitter 102 of FIG. 1, according to some embodiments of the present invention. As shown in FIG. 2, the series 210 of data packets includes a plurality of data packets 220. A respective data packet 220 includes a respective packet identification (ID) 222 and corresponding packet data 224.

According to some embodiments of the present invention, a monitoring station, such as a monitoring station 130a, 130b and/or 120' of FIG. 1, is operable to identify data packets 220 in the series 210 of data packets that are not received successfully by the monitoring station, by indicating packet identifications 222 that correspond to data packets that were or were not received successfully by the monitoring station. Thus, in some embodiments, a successfully received packet ID 222 is provided by the monitoring station to a transmitter controller, such as the transmitter controller 104 of FIG. 1.

Packet transmissions of data including packet headers that have identifications are well known to those having skill in the art, and need not be described further herein. Indeed, embodiments of the present invention can use a conventional packet transmission protocol, such as Internet Protocol (IP) and/or Asynchronous Transfer Mode (ATM) protocol, or simplified versions thereof, to transmit a series 210 of data packets 220 including packet identifications 222 over millimeter microwave frequencies. It will be understood by those having skill in the art that the packet identifications 222 may be sequential, in another predefined order and/or in a random order. Many conventional techniques may be used to identify data packets in the series of data packets that are not received successfully by the monitoring station, such as identification of a last successfully received packet, a first unsuccessfully received packet and/or other conventional techniques. Accordingly, details of packet transmission and identification of packets that were or were not received successfully need not be described herein. Moreover, packet data protocols that are developed in the future also may be used in various embodiments of the present invention.

Moreover, many conventional techniques may be used by the monitoring station 130a, 130b and/or 120' to determine whether a data packet 220 is received successfully. These techniques may be based on a quality metric of the data packets that are received by the monitoring station, such as a received signal strength indication, a bit error rate and/or a frame error rate being greater than or less than a fixed and/or variable threshold. These techniques may also include identification of data packets that are not received at all by the monitoring station. Techniques for determining successful receipt based on a quality metric are well known to those having skill in the art and need not be described further herein. Moreover, future quality metric techniques may be used in various embodiments of the invention.

It also will be understood by those having skill in the art that, in some embodiments, every packet that is indicated by a monitoring station as not being received successfully need not be rebroadcast. For example, in a system that includes a plurality of monitoring stations, it may not be deemed desirable to rebroadcast a packet that is not received successfully by only a single one or a few of the monitoring stations. Accordingly, statistical analysis of the data provided by the monitoring stations, which may factor the location of the monitoring stations, the number of receiving stations near the monitoring station and/or other factors, may be used to determine the desirability of rebroadcasting a data packet that is not successfully received by one or more of the monitoring stations.

Figure 3:
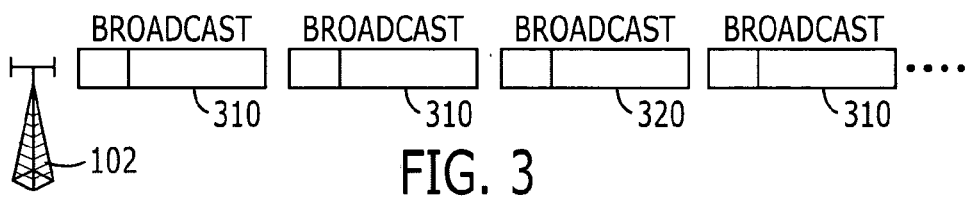

Many different techniques may be used by the transmitting station to broadcast and rebroadcast data packets. For example, in FIG. 3, a millimeter microwave transmitter, such as the millimeter microwave transmitter 102 of FIG. 1, is operable to alternatingly broadcast data packets 310 and rebroadcast data packets 320 over millimeter microwave frequencies to the plurality of millimeter microwave receivers in the millimeter microwave broadcasting system footprint. Accordingly, when clear weather is present, large numbers of broadcast data packets 310 may be serially sent. When the millimeter microwave transmitter controller determines that a packet should be rebroadcast, the rebroadcast packet 320 may be inserted into the broadcast data stream. Transmission of broadcast packets may then resume. Accordingly, alternating transmission of broadcast packets 310 and rebroadcast packets 320 may occur using equal and/or unequal numbers of broadcast and rebroadcast packets. Moreover, the ratio of rebroadcast to broadcast packets may vary dramatically depending upon the number of packets that are deemed desirable by the transmitter controller 104 to rebroadcast. However, in embodiments of FIG. 3, the alternating broadcast and rebroadcast of data packets may take place over the entire bandwidth of the millimeter microwave point-to-multipoint broadcasting system.

Figure 4:
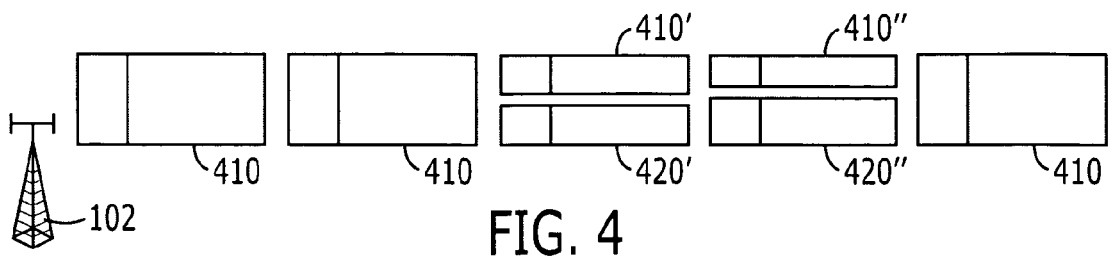

In contrast, as shown in FIG. 4, the bandwidth of the millimeter microwave point-to-multipoint broadcasting system may be shared among the broadcast and rebroadcast data packets, so that the millimeter microwave transmitter, such as the millimeter microwave transmitter 102 of FIG. 1, is operable to simultaneously broadcast data packets and rebroadcast data packets over millimeter microwave frequencies to the plurality of millimeter microwave receivers in the millimeter microwave broadcasting system footprint. Thus, as shown in FIG. 4, when no rebroadcast data packets need be transmitted, the entire bandwidth may be used for broadcast data packets 410. However, when it is deemed desirable to rebroadcast data packets, the bandwidth may be shared among reduced bandwidth broadcast packets 410' and rebroadcast packets 420'. Moreover, the amount of bandwidth that is used for broadcast packets 410 and rebroadcast packets 420 may be varied, as indicated by the relative thicknesses of the broadcast packets 410' and 410", and the rebroadcast packets 420' and 420", in FIG. 4. Variable relative bandwidths may thereby be used to simultaneously broadcast data packets and rebroadcast data packets over millimeter microwave frequencies according to some embodiments of the present invention. It also will be understood that embodiments of FIGS. 3 and 4 may be combined.

In other embodiments of the invention, the transmitter controller 104 may also be operable to control the millimeter microwave transmitter 102 to vary a link margin of the transmitter 104 in response to the monitoring station(s). Thus, in addition to selectively rebroadcasting data packets based on information provided by the monitoring station(s), the link margin of the transmitter may also be varied in response to information provided by the monitoring station(s) to potentially increase the likelihood that the broadcast and/or rebroadcast data packets are received successfully, for example during rain fade. The link margin may be varied by varying the power and/or a modulation parameter, such as the modulation complexity, of the millimeter microwave transmitter 102. For example, modulation complexity may be reduced from a 256 QAM modulation to a 16 QAM modulation during rain fade.

Figure 5:
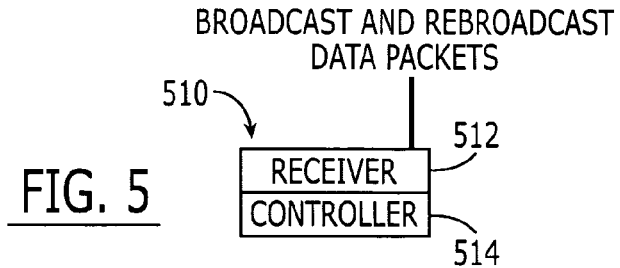
FIG. 5 is a block diagram of a millimeter microwave receiving station according to various embodiments of the present invention.

FIG. 5 is a block diagram of a millimeter microwave receiving station 510 according to some embodiments of the invention. The millimeter microwave receiving station 510 may correspond to millimeter microwave receiving stations 120 and/or 120' of FIG. 1. As shown in FIG. 5, the millimeter microwave receiving station includes a millimeter microwave receiving station receiver 512 and a millimeter microwave receiving station controller 514. The millimeter microwave receiving station receiver 512 is responsive to a transmitting station to receive broadcast and rebroadcast data packets. The millimeter microwave receiver controller 514 is responsive to the broadcast data packets and the rebroadcast data packets that are received, and is operable to substitute a rebroadcast data packet for a broadcast data packet that was not received successfully at the respective millimeter microwave receiver 512. The controller 514 may also be operable to discard a rebroadcast data packet when a corresponding broadcast data packet was received successfully at the respective millimeter microwave receiver 512.

Figure 6:
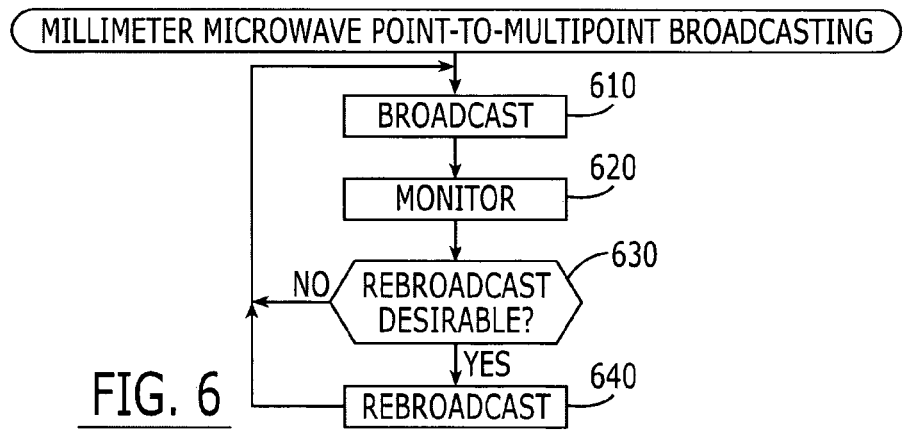
FIGS. 6-8 are flowcharts of operations that may be performed according to various embodiments of the present invention.

FIG. 6 is a flowchart of operations that may be performed for millimeter microwave point-to-multipoint broadcasting, for example using systems and/or methods described in connection with FIGS. 1-5. As shown in FIG. 6, at Block 610, a series of data packets is broadcast over millimeter microwave frequencies to a plurality of millimeter microwave receiving stations 120/120' in a millimeter microwave broadcasting system footprint 122. At Block 620, monitoring is performed at one or more monitoring stations 120', 130a and/or 130b, that are located in a millimeter microwave broadcasting system footprint 122, by identifying data packets 210 in the series 220 of data packets that were, or were not, received successfully by the monitoring station. At Block 630, a determination is made, for example, by a millimeter microwave transmitter controller 104, as to whether rebroadcasting a packet is desirable and, if so, at Block 640, rebroadcasting is performed to the plurality of millimeter microwave receiving stations 120/120' in the millimeter microwave broadcasting system footprint 122, of at least one of the data packets that was identified as not received successfully by at least one of the monitoring stations 120', 130a and/or 130b.

FIG. 6 also illustrates other embodiments of the present invention, wherein at least one of a series of data packets that was broadcast over millimeter microwave frequencies to a plurality of millimeter microwave receiving stations in a millimeter microwave broadcasting system footprint is selectively rebroadcast. Selective rebroadcasting is performed based upon an indication that is received from a subset of the plurality of millimeter microwave receiving stations, that the at least one of the series of data packets that was broadcast was not received successfully by the subset of the plurality of millimeter microwave receiving stations. As was described above, selective rebroadcasting may be based upon statistical analysis of the indications that are received from the monitoring stations and/or the subset of the plurality of millimeter microwave receiving stations.

Figure 7:
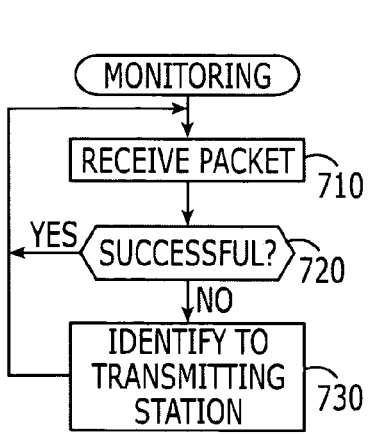

FIG. 7 is a flowchart of monitoring operations that may be performed, for example, by a monitoring station 120', 130a' and/or 130b, according to various embodiments of the present invention. As shown in FIG. 7, at Block 710, a packet is received by a monitoring station. A determination is made at Block 720 as to whether the packet was successfully received, using one or more of the techniques that were described above. If not, then at Block 730, an identification of a packet that was not successfully received is provided to a transmitting station using one or more of the techniques that were described above.

Figure 8:
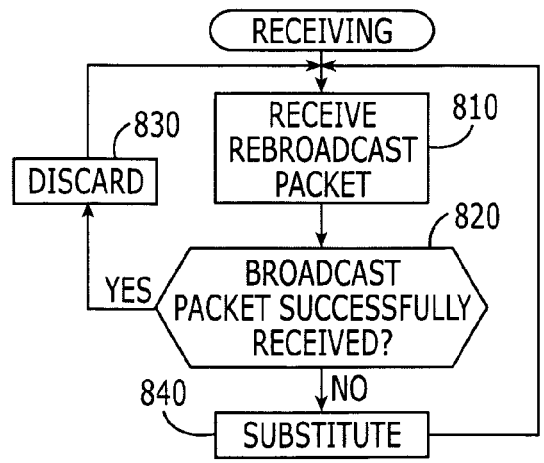

Finally, FIG. 8 is a flowchart of operations that may be performed to receive millimeter microwave point-to-multipoint broadcasting packets according to various embodiments of the invention. These operations may be performed, for example, by receiving stations 120/120' and monitoring stations 120', 130a and or 130b of FIG. 1. In particular, at Block 810, a rebroadcast packet is received. At Block 820, a determination is made as to whether the corresponding broadcast packet was successfully received. If yes, then the rebroadcast packet is discarded at Block 830 and, if not, the rebroadcast packet is substituted for the corresponding broadcast packet at Block 840. As used herein, substituting a rebroadcast data packet for the corresponding broadcast data packet also includes processing both the rebroadcast data packet and the corresponding broadcast data packet to more effectively detect the data therein.

Additional discussion of various embodiments of the present invention now will be provided. Embodiments of the present invention can use one or more monitoring stations to provide control and decision support to a millimeter microwave point-to-multipoint broadcasting network that provides one-way datacasting or broadcasting, including interactive services. At least some data is retransmitted to all users in cases where the monitoring stations identify high error rates and/or lost information. A receiving station is able to identify this redundant transmission and determine whether it is appropriate to keep or discard the redundant information.

Accordingly, in embodiments of the present invention, every receiving station need not include a two-way capability, as may be necessitated by a traditional acknowledge/non-acknowledge (ACK/NACK) system. Rather, some receiving stations on the network may be used as monitoring stations, which can be utilized to monitor and report the integrity of the information received. A subset of the receiving stations used on the system and/or dedicated, physically separate, monitoring stations may be used to monitor the transmissions of the transmitting station.

Accordingly, complete knowledge about the error conditions at every receiving station need not be obtained. Instead, a statistical analysis of the reports sent by the monitoring station(s) may be used to make determinations of what actions are desirable to improve the receive error rates experienced by the monitoring station(s), and, thus, potentially increase the error-free information delivery at a statistically significant number of receiving stations being served by the transmitting station.

Monitoring stations may be connected back to the transmitting station by some form of real time link. That link can be a terrestrially-based wired facility, a satellite-based facility, a dedicated radio frequency channel, a channel or sub-channel of the millimeter microwave system itself and/or other conventional wired and/or wireless links.

The millimeter microwave point-to-multipoint broadcasting system protocol may set aside a percentage of bandwidth to be used for sending this redundant (rebroadcast) information when desirable, or may use the entire channel or a portion of the channel "on the fly", as desirable, to rebroadcast the lost information. This selection of rebroadcasting methodology may be based upon the needs of the system, the amount of buffering in the receiving stations, overhead available in the channel and/or other parameters.

The monitoring stations may be placed at various locations within the coverage area of the transmitting station. The characteristics of the signal, such as received signal strength, bit error rate, frame error rate and/or other characteristics, at this point in space may be characterized as a baseline. This baseline may be used as the basis for average behavior of the location, and may be used to characterize the average propagation losses associated with the path between the transmitter and receiver. The monitoring station(s) may report on broadcast data packets that are not successfully received, and may also continually report on the quality of the received signal. Signal strength, forward error rate, bit error rate and/or any other technique that may be used to define the quality of the signal, may be communicated back to the transmitter controller that can compare current results with the baseline. If one or more monitoring stations show a change in the characteristics of the current results as compared to the baseline, decisions may be made in order to compensate for the change. The decisions may control aspects of the transmitter and/or of the content being transmitted. For example, if the monitoring station receivers show an increase in path loss, there can be many ways to cause the system to compensate for this change. For example, transmit power can be controlled and increased to compensate for the additional path loss, and/or the modulation complexity may be reduced, to thereby decrease the signal-to-noise plus interference ratio that may be used to transmit reliably on the link.

Moreover, retransmission of information may be provided according to various embodiments of the present invention. In this case, in addition to monitoring signal information, the monitoring stations also can monitor the received information and note where an interrupt in the information stream occurs. This information is also reported back to the transmitter controller. If the monitoring station(s) note a change in path attenuation that causes error rate to rise above an acceptable level or causes loss of information, the monitoring station(s) can identify which information was lost. For example, the ID of the last known good transmission may be communicated back to the transmitting station. The controller of the transmitting station can then cause the transmitter to retransmit the errored or missing information.

Since the monitoring stations can only identify the path loss changes at their unique location, they may not be able to determine whether information was lost at all receiving stations in the network. There is a statistical probability that some receiving stations will receive an error free communication. Thus, all receiving stations in the system may be provided with an ability to monitor the incoming communication packet, and have the ability to identify retransmitted packets. If the retransmitted packet is redundant to that already received, then the receiving station can select the least errored copy and discard the redundant information. This can allow uninterrupted flow of information with little or no errors occurring due to the repeated information. Each receiving station may have a different set of lost packets, and each receiving station may independently recover by identifying what rebroadcast packets it needs to secure integrity of the transmission.

Accordingly, embodiments of the invention can be used in a millimeter microwave system to support one-way datacast or broadcast content by allowing the monitoring stations and associated hardware, software and/or firmware in the transmit and receive subsystems, to make decisions about the integrity of the signal strength, error rate and/or information delivery in the covered area. Consistent behavior at all receiving stations may be provided at rain fades that may otherwise interrupt delivery of information to the receiving stations due to the additional path loss caused by the rain.

Moreover, embodiments of the present invention may allow the network to be designed with lower path availability (less system power density margins to overcome rain fade) while still allowing the system to deliver high apparent availability to the users of the system. This would allow the system coverage (footprint) to be significantly increased, since this system link design margins can be significantly decreased, absent rain fade. This may lead to the ability to cover larger link distances, since it is assumed that rain leading to signal fades are low order statistical events. In the rare instance that rain fade affects the link, the system is aware of the increased margin, and can make changes to accommodate the change and maintain apparent availability. It will be understood that, as used herein, "rain fade" means any atmospheric condition that reduces link margins of a millimeter microwave point-to-multipoint broadcasting system.

Figure 9:
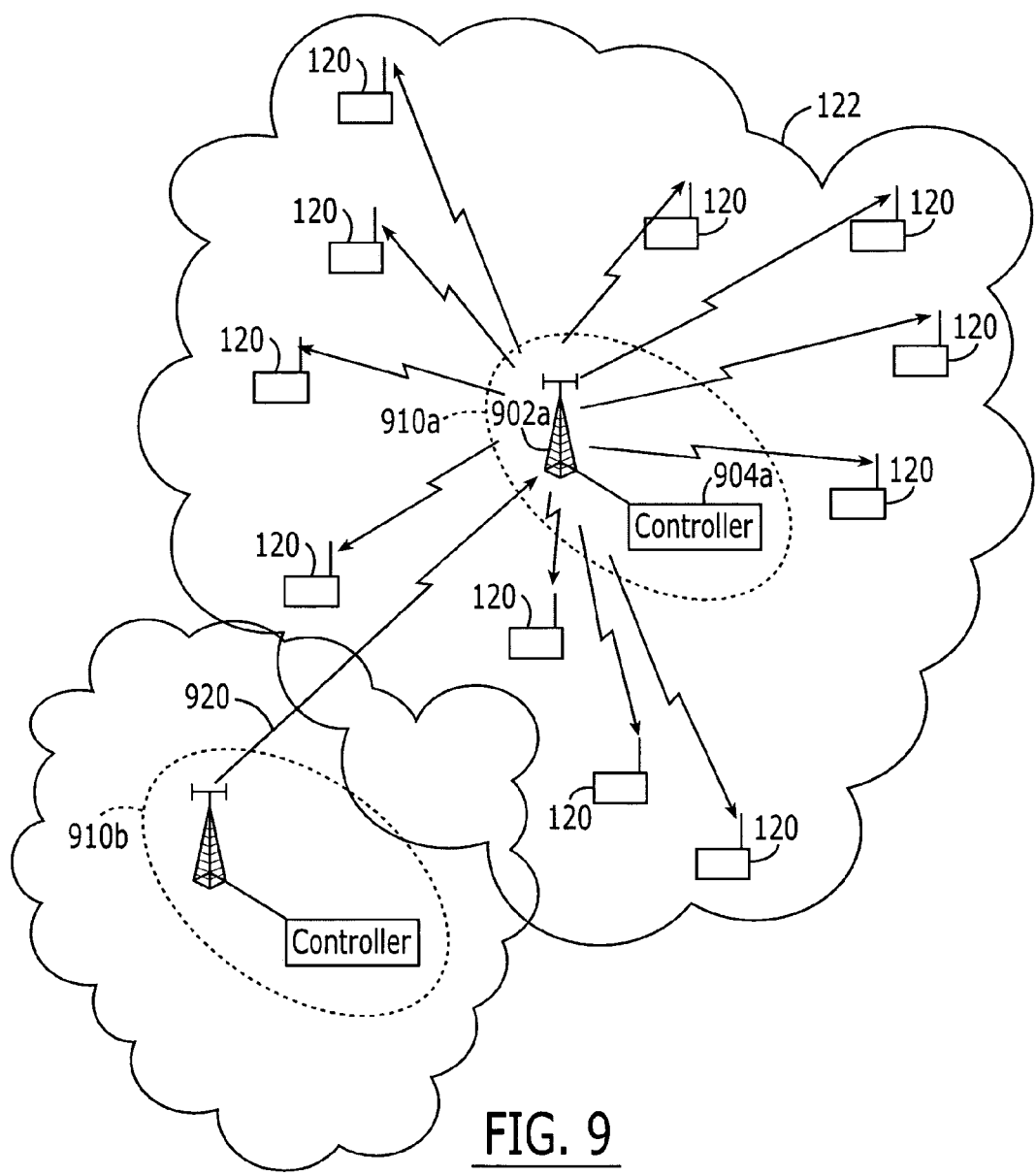
FIG. 9 is a block diagram of millimeter microwave point-to-multipoint broadcasting systems, methods and components according to various other embodiments of the present invention.

FIG. 9 is a block diagram of millimeter microwave point-to-multipoint broadcasting systems, methods and components according to various other embodiments of the present invention. In these embodiments, a millimeter microwave transmitting station also includes a receiver. The millimeter microwave transmitting station is operable to monitor transmissions by one or more adjacent millimeter microwave transmitting stations, and to provide retransmission based on the transmissions that are monitored at the transmitting station itself. These embodiments may be used independent of monitoring stations that were described above. Alternatively, these embodiments may be used in combination with any of the embodiments that were described above in connection with FIGS. 1-8.

More specifically, referring to FIG. 9, a first millimeter microwave transmitting station 910a includes a millimeter microwave transceiver (i.e., a transmitter and a receiver) 902a and a millimeter microwave transmitting station controller 904a. The receiver may be separate from the transmitter or at least partially integrated therewith. The first millimeter microwave transmitting station 910 is operable to broadcast a series of data packets over millimeter microwave frequencies, to a plurality of millimeter microwave receiving stations 120 in a millimeter microwave broadcasting system footprint 122. The first millimeter microwave transmitting station 910a is also operable to identify data packets in the series of data packets that are not received successfully from a second millimeter microwave transmitting station 910b, as shown by arrow 920. The first transmitting station 910a may monitor transmissions from one or more neighboring transmitting stations and may use statistical analysis to determine whether to rebroadcast a data packet.

Still referring to FIG. 9, the first millimeter microwave transmitting station controller 904a is operable to control the first millimeter microwave transmitting station 910a, to rebroadcast to the plurality of millimeter microwave receiving stations 120 in the millimeter microwave broadcasting system footprint 122a, at least one of the data packets that was identified as not received successfully from the second millimeter microwave transmitting station 910b.

Thus, a given millimeter microwave transmitting station can operate as its own monitoring station by monitoring transmissions from adjacent millimeter microwave transmitting stations, as shown, for example, by the arrow 920. It will be understood that the transmission that is received from the second transmitting station 910b may be on the same or different frequencies as the transmissions by the first transmitting station 910 to the plurality of millimeter microwave receiving stations 120. It will also be understood that embodiments of FIG. 9 may be used independently of FIGS. 1-8, or in combination with any or all of the embodiments of FIGS. 1-8.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A millimeter microwave point-to-multipoint broadcasting system comprising:
   a millimeter microwave transmitter that is operable to broadcast a series of data packets over millimeter microwave frequencies to a plurality of millimeter microwave receiving stations in a millimeter microwave broadcasting system footprint;
   a monitoring station that is located in the millimeter microwave broadcasting system footprint and that is operable to identify data packets in the series of data packets that are not received successfully by the monitoring station; and
   a millimeter microwave transmitter controller that is responsive to the monitoring station and that is operable to control the millimeter microwave transmitter to rebroadcast to the plurality of millimeter microwave receiving stations in the millimeter microwave broadcasting system footprint, at least one of the data packets that was identified as not received successfully by the monitoring station.

2. A system according to claim 1 wherein the monitoring station is a first monitoring station, the system further comprising a second monitoring station that is located in the millimeter microwave broadcasting system footprint and that is operable to identify data packets in the series of data packets that are not received successfully by the second monitoring station, the millimeter microwave transmitter controller being responsive to the first and second monitoring stations and operable to control the millimeter microwave transmitter to rebroadcast to the plurality of millimeter microwave receiving stations in the millimeter microwave broadcasting system footprint, at least one of the data packets that was identified as not received successfully by the first and/or second monitoring stations.

3. A system according to claim 2 wherein the millimeter microwave transmitter controller is operable to control the millimeter microwave transmitter to rebroadcast to the plurality of millimeter microwave receiving stations in the millimeter microwave broadcasting system footprint, at least one of the data packets that was identified as not received successfully by the first and/or second monitoring stations, by statistically analyzing the at least one of the data packets that was identified as not received successfully by the first and/or second monitoring stations.

4. A system according to claim 1 wherein a respective data packet includes a respective packet identification, and wherein the monitoring station is operable to identify data packets in the series of data packets that are not received successfully by the monitoring station by indicating packet identifications that identify data packets that were or were not received successfully by the monitoring station.

5. A system according to claim 1 wherein the monitoring station is operable to identify data packets in the series of data packets that are not received successfully by the monitoring station based on a quality metric of the data packets that are received by the monitoring station and/or to identify data packets that are not received at all by the monitoring station.

6. A system according to claim 3 wherein the quality metric comprises a received signal strength indication, a bit error rate and/or a frame error rate.

7. A system according to claim 1 in combination with the plurality of millimeter microwave receiving stations in the millimeter microwave broadcasting system footprint, a respective millimeter microwave receiving station being responsive to the series of data packets that are broadcast and the at least one data packet that is rebroadcast and operable to substitute a rebroadcast data packet for a corresponding broadcast data packet that was not received successfully at the respective millimeter microwave receiving station.

8. A system according to claim 7 wherein a respective millimeter microwave receiving station is also operable to discard a rebroadcast data packet when a corresponding broadcast data packet was received successfully at the respective millimeter microwave receiving station.

9. A system according to claim 1 wherein the millimeter microwave transmitter is operable to alternatingly broadcast data packets and rebroadcast data packets over millimeter microwave frequencies to the plurality of millimeter microwave receiving stations in the millimeter microwave broadcasting system footprint.

10. A system according to claim 1 wherein the millimeter microwave transmitter is operable to simultaneously broadcast data packets and rebroadcast data packets over millimeter microwave frequencies to the plurality of millimeter microwave receiving stations in the millimeter microwave broadcasting system footprint.

11. A system according to claim 10 wherein the millimeter microwave transmitter is operable to simultaneously broadcast data packets and rebroadcast data packets over millimeter microwave frequencies using variable relative bandwidths.

12. A system according to claim 1 wherein the millimeter microwave transmitter controller is also operable to control the millimeter microwave transmitter to vary a link margin of the transmitter in response to the monitoring station.

13. A system according to claim 12 wherein the millimeter microwave transmitter controller is operable to control the millimeter microwave transmitter to vary a link margin of the transmitter in response to the monitoring station by varying power and/or a modulation parameter of the millimeter microwave transmitter.

14. A system according to claim 1 wherein the monitoring station is at least partially integrated with one of the millimeter microwave receiving stations.

15. A transmitting station for a millimeter microwave point-to-multipoint broadcasting system comprising:
 a millimeter microwave transmitter that is operable to broadcast a series of data packets over millimeter microwave frequencies to a plurality of millimeter microwave receiving stations in a millimeter microwave broadcasting system footprint; and
 a millimeter microwave transmitter controller that is responsive to a monitoring station that is located in the millimeter microwave broadcasting system footprint and that is operable to identify data packets in the series of data packets that are not received successfully by the monitoring station, the millimeter microwave transmitter controller being operable to control the millimeter microwave transmitter to rebroadcast to the plurality of millimeter microwave receiving stations in the millimeter microwave broadcasting system footprint, at least one of the data packets that was identified as not received successfully by the monitoring station.

16. A transmitting station according to claim 15 wherein the monitoring station is a first monitoring station, the point-to-multipoint broadcasting system further comprising a second monitoring station that is located in the millimeter microwave broadcasting system footprint and that is operable to identify data packets in the series of data packets that are not received successfully by the second monitoring station, the millimeter microwave transmitter controller being responsive to the first and second monitoring stations and operable to control the millimeter microwave transmitter to rebroadcast to the plurality of millimeter microwave receiving stations in the millimeter microwave broadcasting system footprint, at least one of the data packets that was identified as not received successfully by the first and/or second monitoring stations.

17. A transmitting station according to claim 16 wherein the millimeter microwave transmitter controller is operable to control the millimeter microwave transmitter to rebroadcast to the plurality of millimeter microwave receiving stations in the millimeter microwave broadcasting system footprint, at least one of the data packets that was identified as not received successfully by the first and/or second monitoring stations, by statistically analyzing the at least one of the data packets that was identified as not received successfully by the first and/or second monitoring stations.

18. A transmitting station according to claim 15 wherein a respective data packet includes a respective packet identification, and wherein the millimeter microwave transmitter is responsive to packet identifications from the monitoring station of data packets in the series of data packets that are not received successfully by the monitoring station.

19. A transmitting station according to claim 15 wherein the millimeter microwave transmitter controller is operable to control the millimeter microwave transmitter to alternatingly broadcast data packets and rebroadcast data packets over millimeter microwave frequencies to the plurality of millimeter microwave receiving stations in the millimeter microwave broadcasting system footprint.

20. A transmitting station according to claim 15 wherein the millimeter microwave transmitter controller is operable to control the millimeter microwave transmitter to simultaneously broadcast data packets and rebroadcast data packets over millimeter microwave frequencies to the plurality of millimeter microwave receiving stations in the millimeter microwave broadcasting system footprint.

21. A transmitting station according to claim 20 wherein the millimeter microwave transmitter controller is operable to control the millimeter microwave transmitter to simultaneously broadcast data packets and rebroadcast data packets over millimeter microwave frequencies to the plurality of millimeter microwave receiving stations in the millimeter microwave broadcasting system footprint using variable relative bandwidths.

22. A transmitting station according to claim 15 wherein the millimeter microwave transmitter controller is also operable to control the millimeter microwave transmitter to vary a link margin of the transmitter in response to the monitoring station.

23. A transmitting station according to claim 22 wherein the millimeter microwave transmitter controller is operable to control the millimeter microwave transmitter to vary a link margin of the transmitter in response to the monitoring station by varying power and/or a modulation parameter of the millimeter microwave transmitter.

24. A monitoring station for a millimeter microwave point-to-multipoint broadcasting system that includes a millimeter microwave transmitting station that is operable to broadcast a series of data packets over millimeter microwave frequencies to a plurality of millimeter microwave receiving stations in a millimeter microwave broadcasting system footprint, the monitoring station comprising:
  a receiver that is configured to be located in the millimeter microwave broadcasting system footprint and that is operable to receive the series of packets that is broadcast by the millimeter microwave transmitting station; and
  a monitoring station controller that is operable to identify data packets in the series of data packets that are not received successfully by the receiver.

25. A monitoring station according to claim 24 wherein a respective data packet includes a respective packet identification, and wherein the monitoring station controller is operable to identify data packets in the series of data packets that are not received successfully by the receiver by indicating packet identifications that identify data packets that were or were not received successfully by the monitoring station.

26. A monitoring station according to claim 25 wherein the monitoring station controller is operable to identify data packets in the series of data packets that are not received successfully by the monitoring station based on a quality metric of the data packets that are received by the receiver and/or to identify data packets that are not received at all by the receiver.

27. A monitoring station according to claim 26 wherein the quality metric comprises a received signal strength indication, a bit error rate and/or a frame error rate.

28. A monitoring station according to claim 24 that is at least partially integrated with one of the millimeter microwave receiving stations.

29. A millimeter microwave point-to-multipoint broadcasting method comprising:
  selectively rebroadcasting at least one of a series of data packets that was broadcast over millimeter microwave frequencies to a plurality of millimeter microwave receiving stations in a millimeter microwave broadcasting system footprint, based upon an indication that is received from a subset of the plurality of millimeter microwave receiving stations, that the at least one of a series of data packets that was broadcast was not received successfully by the subset of the plurality of millimeter microwave receiving stations, and based upon statistical analysis of the indications that are received from the subset of the plurality of millimeter microwave receiving stations.

30. A method according to claim 29 wherein the subset of the plurality of millimeter microwave receiving stations consists of two or more but less than all of the plurality of millimeter microwave receiving stations.

31. A method according to claim 29 wherein a respective data packet includes a respective packet identification, and wherein the indication comprises packet identifications that identify data packets that were or were not received successfully by the subset of the plurality of millimeter microwave receiving stations.

32. A method according to claim 29 wherein selectively rebroadcasting comprises alternatingly broadcasting data packets and selectively rebroadcasting at least one of the series of data packets.

33. A method according to claim 29 wherein selectively rebroadcasting comprises simultaneously broadcasting data packets and selectively rebroadcasting at least one of the series of data packets.

34. A method according to claim 33 wherein selectively rebroadcasting comprises simultaneously broadcasting data packets and selectively rebroadcasting at least one of the series of data packets using variable relative bandwidths.

35. A method according to claim 29 further comprising varying a link margin of the series of data packets that is broadcast and/or the at least one of the series of data packets that is rebroadcast based upon the indication that is received from the subset of the plurality of millimeter microwave receiving stations, that the at least one of a series of data packets that was broadcast was not received successfully by the subset of the plurality of millimeter microwave receiving stations.

36. A method according to claim 35 wherein varying a link margin comprises varying power and/or a modulation parameter of the series of data packets that is broadcast and/or the at least one of the series of data packets that is rebroadcast.

37. A method according to claim 29 wherein at least one of the subset of the plurality of millimeter microwave receiving stations is a monitoring station.

38. A method according to claim 37 wherein the monitoring station is at least partially integrated with one of the subset of the plurality of the millimeter microwave receiving stations.

39. A millimeter microwave point-to-multipoint broadcasting system comprising:
  a first millimeter microwave transmitting station; and
  a plurality of millimeter microwave receiving stations in a millimeter microwave broadcasting system footprint;
  wherein the first millimeter microwave transmitting station is operable to broadcast a series of data packets over millimeter microwave frequencies to the plurality of millimeter microwave receiving stations in the millimeter microwave broadcasting system footprint, the first millimeter microwave transmitting station also being operable to identify data packets in the series of data packets that are not received successfully from a second millimeter microwave transmitting station;

the first millimeter microwave transmitting station further comprising a millimeter microwave transmitting station controller that is operable to control the first millimeter microwave transmitting station to rebroadcast to the plurality of millimeter microwave receiving stations in the millimeter microwave broadcasting system footprint, at least one of the data packets that was identified as not received successfully from the second millimeter microwave transmitting station; and wherein a respective millimeter microwave receiving station of the plurality of millimeter microwave receiving stations in the millimeter microwave broadcasting system footprint, is responsive to the series of data packets that are broadcast and the at least one data packet that is rebroadcast and operable to substitute a rebroadcast data packet for a corresponding broadcast data packet that was not received successfully at the respective millimeter microwave receiving station, wherein the first millimeter microwave transmitting station is operable to simultaneously broadcast data packets and rebroadcast data packets over millimeter microwave frequencies using variable relative bandwidths to the plurality of millimeter microwave receiving stations in the millimeter microwave broadcasting system footprint.

40. A system according to claim 39 wherein a respective data packet includes a respective packet identification, and wherein the first millimeter microwave transmitting station is operable to identify data packets in the series of data packets that are not received successfully from the second millimeter microwave transmitting station by indicating packet identifications that identify data packets that were or were not received successfully by the first millimeter microwave transmitting station.

41. A system according to claim 39 wherein the first millimeter microwave transmitting station is operable to identify data packets in the series of data packets that are not received successfully from the second millimeter microwave transmitting station based on a quality metric of the data packets that are received by the first millimeter microwave transmitting station and/or to identify data packets that are not received at all by the first millimeter microwave transmitting station.

42. A system according to claim 41 wherein the quality metric comprises a received signal strength indication, a bit error rate and/or a frame error rate.

43. A system according to claim 39 wherein a respective millimeter microwave receiving station is also operable to discard a rebroadcast data packet when a corresponding broadcast data packet was received successfully at the respective millimeter microwave receiving station.

44. A system according to claim 39 wherein the first millimeter microwave transmitting station is operable to alternatingly broadcast data packets and rebroadcast data packets over millimeter microwave frequencies to the plurality of millimeter microwave receiving stations in the millimeter microwave broadcasting system footprint.

45. A millimeter microwave point-to-multipoint broadcasting method comprising:

selectively rebroadcasting at least one of a series of data packets that was broadcast over millimeter microwave frequencies to a plurality of millimeter microwave receiving stations in a millimeter microwave broadcasting system footprint, based upon an indication that is received from a subset of the plurality of millimeter microwave receiving stations, that the at least one of a series of data packets that was broadcast was not received successfully by the subset of the plurality of millimeter microwave receiving stations, wherein selectively rebroadcasting comprises simultaneously broadcasting data packets and selectively rebroadcasting at least one of the series of data packets using variable relative bandwidths.

46. A method according to claim 45 wherein the subset of the plurality of millimeter microwave receiving stations consists of a single millimeter microwave receiving station.

47. A method according to claim 45 wherein the subset of the plurality of millimeter microwave receiving stations consists of two or more but less than all of the plurality of millimeter microwave receiving stations.

48. A method according to claim 45 wherein a respective data packet includes a respective packet identification, and wherein the indication comprises packet identifications that identify data packets that were or were not received successfully by the subset of the plurality of millimeter microwave receiving stations.

49. A method according to claim 45 wherein selectively rebroadcasting comprises selectively rebroadcasting at least one of a series of data packets that was broadcast over millimeter microwave frequencies to a plurality of millimeter microwave receiving stations in a millimeter microwave broadcasting system footprint based upon statistical analysis of the indications that are received from the subset of the plurality of millimeter microwave receiving stations.

50. A method according to claim 45 further comprising varying a link margin of the series of data packets that is broadcast and/or the at least one of the series of data packets that is rebroadcast based upon the indication that is received from the subset of the plurality of millimeter microwave receiving stations, that the at least one of a series of data packets that was broadcast was not received successfully by the subset of the plurality of millimeter microwave receiving stations.

51. A method according to claim 50 wherein varying a link margin comprises varying power and/or a modulation parameter of the series of data packets that is broadcast and/or the at least one of the series of data packets that is rebroadcast.

52. A method according to claim 45 wherein at least one of the subset of the plurality of millimeter microwave receiving stations is a monitoring station.

53. A method according to claim 52 wherein the monitoring station is at least partially integrated with one of the subset of the plurality of the millimeter microwave receiving stations.

54. A millimeter microwave point-to-multipoint broadcasting method comprising:

selectively rebroadcasting at least one of a series of data packets that was broadcast over millimeter microwave frequencies to a plurality of millimeter microwave receiving stations in a millimeter microwave broadcasting system footprint, based upon an indication that is received from a subset of the plurality of millimeter microwave receiving stations, that the at least one of a series of data packets that was broadcast was not received successfully by the subset of the plurality of millimeter microwave receiving stations; and varying a link margin of the series of data packets that is broadcast and/or the at least one of the series of data packets that is rebroadcast based upon the indication that is received from the subset of the plurality of millimeter microwave receiving stations, that the at least one of a series of data packets that was broadcast was not received successfully by the subset of the plurality of millimeter microwave receiving stations.

55. A method according to claim 54 wherein the subset of the plurality of millimeter microwave receiving stations consists of a single millimeter microwave receiving station.

56. A method according to claim 54 wherein the subset of the plurality of millimeter microwave receiving stations consists of two or more but less than all of the plurality of millimeter microwave receiving stations.

57. A method according to claim 54 wherein a respective data packet includes a respective packet identification, and wherein the indication comprises packet identifications that identify data packets that were or were not received successfully by the subset of the plurality of millimeter microwave receiving stations.

58. A method according to claim 54 wherein selectively rebroadcasting comprises selectively rebroadcasting at least one of a series of data packets that was broadcast over millimeter microwave frequencies to a plurality of millimeter microwave receiving stations in a millimeter microwave broadcasting system footprint based upon statistical analysis of the indications that are received from the subset of the plurality of millimeter microwave receiving stations.

59. A method according to claim 54 wherein selectively rebroadcasting comprises alternatingly broadcasting data packets and selectively rebroadcasting at least one of the series of data packets.

60. A method according to claim 54 wherein selectively rebroadcasting comprises simultaneously broadcasting data packets and selectively rebroadcasting at least one of the series of data packets.

61. A method according to claim 60 wherein selectively rebroadcasting comprises simultaneously broadcasting data packets and selectively rebroadcasting at least one of the series of data packets using variable relative bandwidths.

62. A method according to claim 54 wherein varying a link margin comprises varying power and/or a modulation parameter of the series of data packets that is broadcast and/or the at least one of the series of data packets that is rebroadcast.

63. A method according to claim 54 wherein at least one of the subset of the plurality of millimeter microwave receiving stations is a monitoring station.

64. A method according to claim 63 wherein the monitoring station is at least partially integrated with one of the subset of the plurality of the millimeter microwave receiving stations.

* * * * *

UNITED STATES PATENT AND TRADEMARK OFFICE
CERTIFICATE OF CORRECTION

| | | |
|---|---|---|
| PATENT NO. | : 7,499,708 B2 | Page 1 of 1 |
| APPLICATION NO. | : 10/937714 | |
| DATED | : March 3, 2009 | |
| INVENTOR(S) | : Singh et al. | |

It is certified that error appears in the above-identified patent and that said Letters Patent is hereby corrected as shown below:

Column 15, Claim 6, Line 42: Please correct "claim 3" to read -- claim 5 --

Signed and Sealed this

Fifth Day of May, 2009

JOHN DOLL
*Acting Director of the United States Patent and Trademark Office*